(12) United States Patent
Lin et al.

(10) Patent No.: US 7,171,350 B2
(45) Date of Patent: Jan. 30, 2007

(54) METHOD FOR NAMED-ENTITY RECOGNITION AND VERIFICATION

(75) Inventors: Yi-Chung Lin, Keelung (TW); Peng-Hsiang Hung, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 911 days.

(21) Appl. No.: 10/227,470

(22) Filed: Aug. 26, 2002

(65) Prior Publication Data

US 2003/0208354 A1 Nov. 6, 2003

(30) Foreign Application Priority Data

May 3, 2002 (TW) ................. 91109292 A

(51) Int. Cl.
*G06F 17/27* (2006.01)
(52) U.S. Cl. ......................................... 704/9
(58) Field of Classification Search .................. None
See application file for complete search history.

(56) References Cited

U.S. PATENT DOCUMENTS 5,819,265 A * 10/1998 Ravin et al. .................... 707/5
6,311,152 B1 * 10/2001 Bai et al. ......................... 704/9
6,694,055 B2 * 2/2004 Wu ................................. 382/185

OTHER PUBLICATIONS

Sassano et al., "Named entity chunking techniques in supervised learning for Japanese named entity recognition", Proceedings of the 18th conference on Computational linguistics, Saarbrücken, Germany, 2000, vol. 2, pp. 705-711.*

Palmer et al., "A statistical profile of the Named Entity task", Proceedings of the fifth conference on Applied natural language processing, Washington, DC, 1997, pp. 190-193.*

Carniak, "Unsupervised learning of name structure from coreference data", Second meeting of the North American Chapter of the Association for Computational Linguistics on Language technologies, Pittsburgh, Pennsylvania, 2001, pp. 1-7.*

Mikheev et al., "Named Entity recognition without gazetteers", Proceedings of the ninth conference on European chapter of the Association for Computational Linguistics, Bergen, Norway, 1999, pp. 1-8.*

Collins et al., "Unsupervised Models for Named Entity Classification", In Proceedings of the Joint SIGDAT Conference on Empirical Methods in Natural Language Processing and Very Large Corpora, 1999, pp. 100-110.*

* cited by examiner

*Primary Examiner*—David Hudspeth
*Assistant Examiner*—Brian L. Albertalli
(74) *Attorney, Agent, or Firm*—Bacon & Thomas, PLLC

(57) ABSTRACT

A method for named-entity (NE) recognition and verification is provided. The method can extract at least one to-be-tested segments from an article according to a text window, and use a predefined grammar to parse the at least one to-be-tested segments to remove ill-formed ones. Then, a statistical verification model is used to calculate the confidence measurement of each to-be-tested segment to determine where the to-be-tested segment has a named-entity or not. If the confidence measurement is less than a predefined threshold, the to-be-tested segment will be rejected. Otherwise, it will be accepted.

18 Claims, 3 Drawing Sheets

METHOD FOR NAMED-ENTITY RECOGNITION AND VERIFICATION

BACKGROUND OF THE INVENTION

1. Field of the Invention

The present invention relates to a method for named-entity recognition and verification, and more particularly, to a method for named-entity recognition and verification suitable for different languages and application fields.

2. Description of Related Art

As for information processing, named-entity (NE) recognition is an important task for many natural language applications, such as Internet search engines, document indexing, information extraction and machine translation, so as to find the entities of person, location, organization, date, time, percentage and monetary value in text documents. Moreover, in oriental languages (such as Chinese, Japanese and Korean), NE recognition is even more important because it significantly affects the performance of word segmentation, the most fundamental task for understanding the texts in oriental languages. To provide better performance, it is therefore important to accurately combine the information of named-entity with the aforementioned natural language application.

There are two major approaches to NE recognition: the handcrafted approach and the statistical approach. In the first approach, a system usually relies on a large number of handcrafted rules. For example, if the term "Mayor" appears in the text, and the next word is a given name, the system will determine the subsequent words to be a family name. These type of systems can be rapidly prototyped for the computer to process texts with ease. But the shortcoming is such that the number of rules may be increased rapidly, and thus the systems will be harder to maintain and difficult to scale up. Another serious problem with the handcrafted approach is that the system is hard to be ported across different domains (for example, a system originally designed to search for people's name being ported to search for toponym) and different languages. Porting a handcrafted system usually means rewriting all its rules.

To eliminate the above problems, the statistical approach was developed. In general, the statistical approach to NE recognition can be viewed as a two-stage process. First, according to dictionaries and/or pattern matching rules, the input text is tokenized into tokens. Each token may be a word or an NE candidate which can consist of more than one word. Then, a statistical model, such as N-gram model, is used to select the most likely token sequence. Finally, the tokens labeled as NE candidates are picked out from the most likely token sequence. Although, the statistical NE recognition is much more scaleable and portable, its performance is still not satisfactory. Furthermore, the design of each matching rule will significantly influence the final result. A similar problem is encountered in which the number of rules is getting more and the system is getting larger. Therefore, the above conventional named-entity recognition methods desired to be improved.

SUMMARY OF THE INVENTION

An object of the present invention is to provide a method for named-entity recognition and verification, which utilizes a statistical verification model of optimal hypothesis test to establish a verification model so as to identify and verify the named-entity from the context.

Another object of the present invention is to provide a method for named-entity recognition and verification, which can simplify the programming and increase the portability to other named-entity recognition domains.

A further object of the present invention is to provide a method for named-entity recognition and verification, which makes the segmentation of the text with ease and therefore increases the verifiability.

To achieve these and other objects of the present invention, the method for method for named-entity recognition and verification comprises the steps of: (A) segmenting text data from an article into at least one to-be-tested segments according to a text window; (B) parsing the to-be-tested segments to remove ill-formed segments from the to-be-tested segments according to a predefined grammar; (C) using a hypothesis test to access a confidence measure of each to-be-tested segment, wherein the confidence measure is determined from dividing a probability of assuming that the to-be-tested segment has a named-entity by a probability of assuming that the to-be-tested segment doesn't have a named-entity; and (D) determining that the to-be-tested segment has a named-entity if the confidence measure is greater than a predefined threshold.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
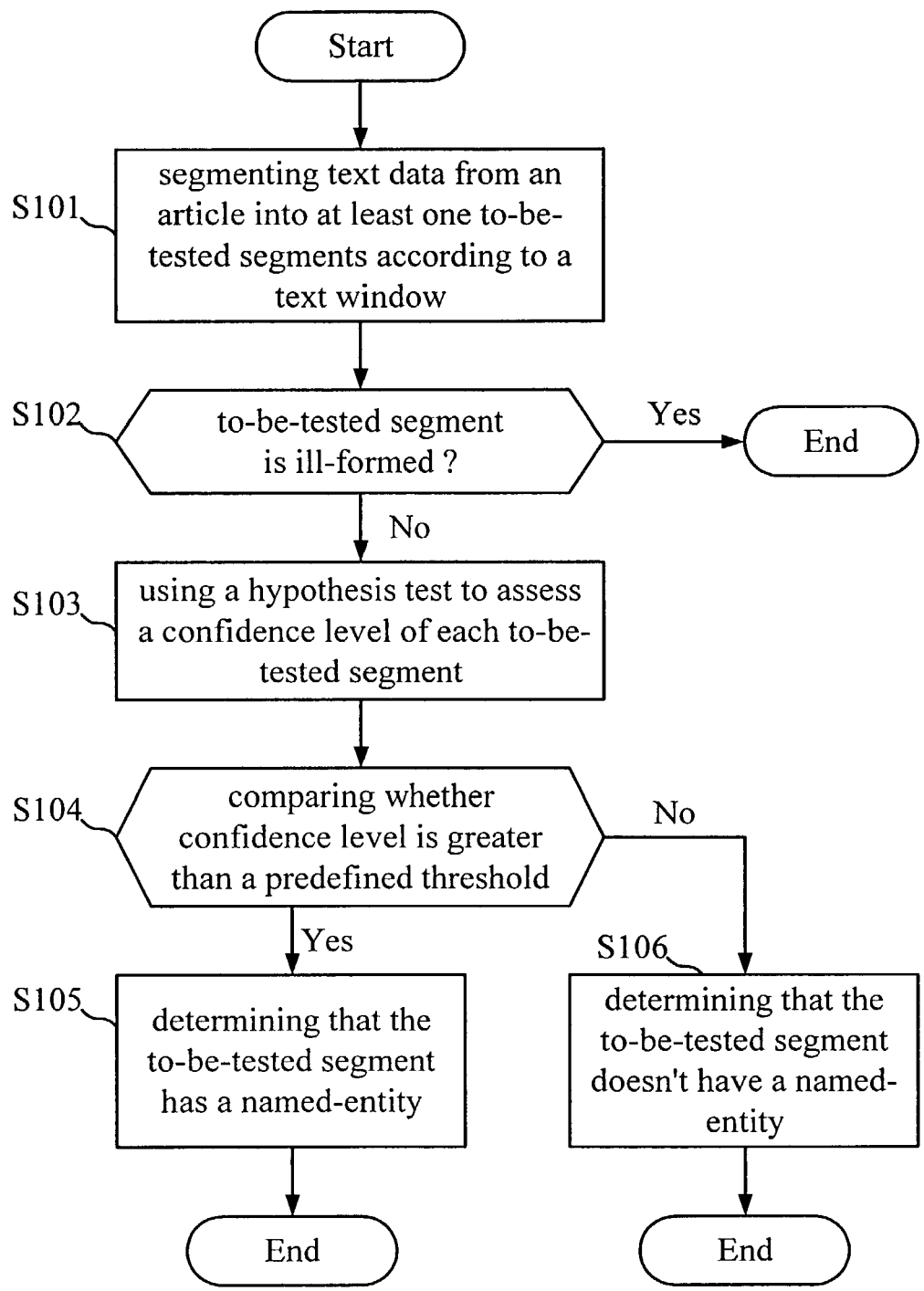
FIG. 1 is a flow chart showing the operation of the present invention.
Figure 2:
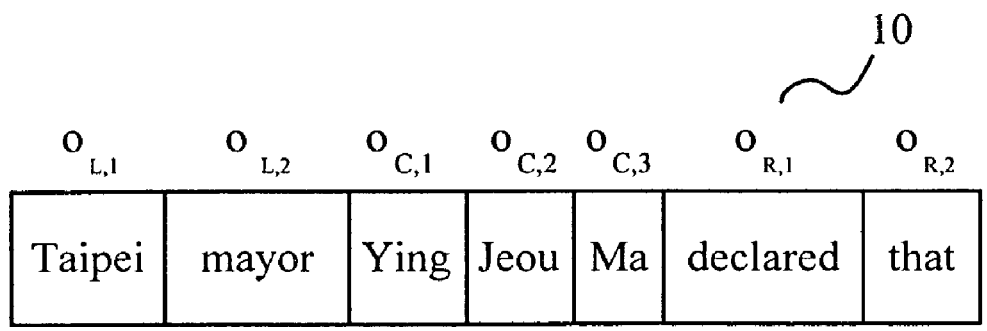
FIG. 2 is a schematic drawing showing a to-be-tested segment extracted according to a text window of the present invention.

With reference to FIG. 1, there is shown a flow chart of the named-entity recognition and verification method in accordance with a preferred embodiment of the present invention. First, text data from an article will be segmented into at least one to-be-tested segment according to a text window (step S101). In this embodiment, the predefined text window has seven words as shown in FIG. 2, wherein the text window comprises a candidate and its left and right contexts, where the named-entity of the to-be-tested segment corresponds to the candidate. The whole text window can be expressed as a random vector $$O = (o_{L,1}^{L,x}, o_{C,1}^{C,y}, o_{R,1}^{R,z}),$$

where $$o_{C,1}^{C,y}$$

is the candidate composed of random variables "$o_{c,1}$, $o_{c,2}$ ..., $O_{c,y}$";

$$o_{L,1}^{L,x}$$

is the left context of the candidate composed of random variables "$o_{L,1}, o_{L,2} \ldots, o_{L,x}$";

$$o_{R,1}^{R,z}$$

is the right context of the candidate composed of random variables "$o_{R,1}, o_{R,2} \ldots, o_{R,z}$"; and x, y, and z are the number of characters in accordance with $$o_{C,1}^{C,y}, o_{L,1}^{L,x},$$

and $$o_{R,1}^{R,z}.$$

In this embodiment, x=z=2, and y=3. However, in other cases, the number of random variables can be varied according to the type of named-entities.

This embodiment is used to determine whether an article has a person's name or not. Each random variable is an English word. For example, an article of "the Taipei mayor Ying Jeou Ma declared that the city government will hold a . . ." can be segmented into a plurality of to-be-tested segments in turn according to the predefined text window, including "the Taipei mayor Ying Jeou Ma declared", "Taipei mayor Ying Jeou Ma declared that", "mayor Ying Jeou Ma declared that the", and so on. Each to-be-tested segment has a candidate and its left and right contexts.

In this embodiment, the to-be-tested segment 10 is "Taipei mayor Ying Jeou Ma declared that", where "Ying Jeou Ma" is the candidate $$o_{C,1}^{C,3},$$

"Taipei mayor" is the left context $$o_{L,1}^{L,2},$$

and "declared that" is the right context $$o_{R,1}^{R,2}.$$

Furthermore, the method according to the present invention can also be used in Chinese, wherein each random variable is a Chinese character. Of course the method can be used in Eastern languages such as Korean or Japanese.

Figure 3:
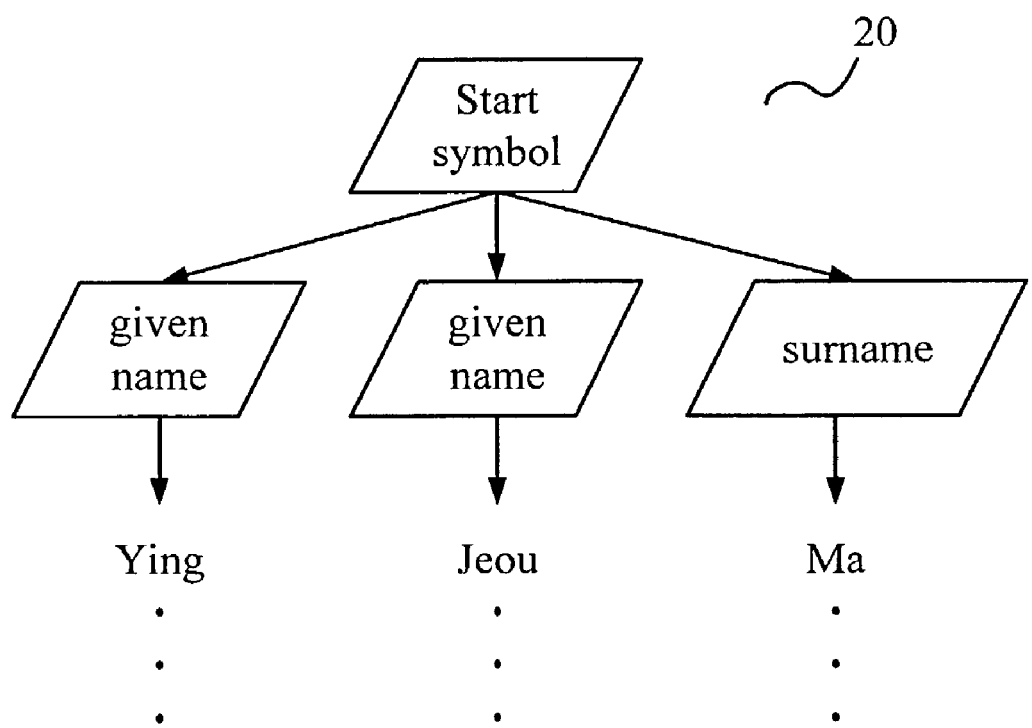
FIG. 3 is a schematic drawing showing a parsing tree formed according to the candidate of the to-be-tested segment illustrated in FIG. 2.

According to the above method, a plurality of to-be-tested segments can be extracted from an article according to the text window. As a result of recognizing and verifying whether the candidate is a person's name, the to-be-tested segments will be parsed by a predefined grammar to remove ill-formed to-be-tested segments (step S102). With reference to FIG. 3, there is shown a parsing tree 20 formed according to the candidate of the to-be-tested segment 10 illustrated in FIG. 2. With the rule of giving names, it is known that the last word is always the family name. Therefore, if there is a punctuation mark or an ill-formed word for a family name shown in the random variable $O_{c,3}$, the rule of giving names is not satisfied. Likewise, if there is a punctuation mark or any ill-formed word shown in the random variable $O_{c,1}$ and $O_{c,2}$, the rule of giving names is not satisfied. When the candidate of the to-be-tested segment does not conform to the rule of giving names, it indicates that the candidate does not include named-entity, and thus the to-be-tested segment is removed and the process is terminated.

If the to-be-tested segment conforms to the rule of giving names, a hypothesis test is used to determine a confidence measure of each to-be-tested segment to have a named-entity (step S103). In this embodiment, the confidence measure is determined by using Neyman-Pearson Lemma theory, and is obtained from dividing a probability of assuming that the to-be-tested segment has a named-entity by a probability of assuming that the to-be-tested segment doesn't have a named-entity.

In the hypothesis test, a null hypothesis ($H_0$) assumes that the to-be-tested segment has a named-entity, and an alternative hypothesis ($H_1$) assumes that the to-be-tested segment doesn't have a named-entity. Therefore, according to the above hypothesis, it is able to obtain the log likelihood ratio of the confidence measure as follows:

$$LLR(o_{L,1}^{L,x}, o_{C,1}^{C,y}, o_{R,1}^{R,z}) = \log \frac{P(o_{L,1}^{L,x}, o_{C,1}^{C,y}, o_{R,1}^{R,z} \mid H_0)}{P(o_{L,1}^{L,x}, o_{C,1}^{C,y}, o_{R,1}^{R,z} \mid H_1)}$$

$$(i.e., \log P(o_{L,1}^{L,x}, o_{C,1}^{C,y}, o_{R,1}^{R,z} \mid H_0) - \log P(o_{L,1}^{L,x}, o_{C,1}^{C,y}, o_{R,1}^{R,z} \mid H_1)),$$

where $$P(o_{L,1}^{L,x}, o_{C,1}^{C,y}, o_{R,1}^{R,z} \mid H_0)$$

is the probability of assuming that the to-be-tested segment has a named-entity, and $$P(o_{L,1}^{L,x}, o_{C,1}^{C,y}, o_{R,1}^{R,z} \mid H_1)$$

is the probability of assuming that the to-be-tested segment does not have a named-entity.

Figure 4:
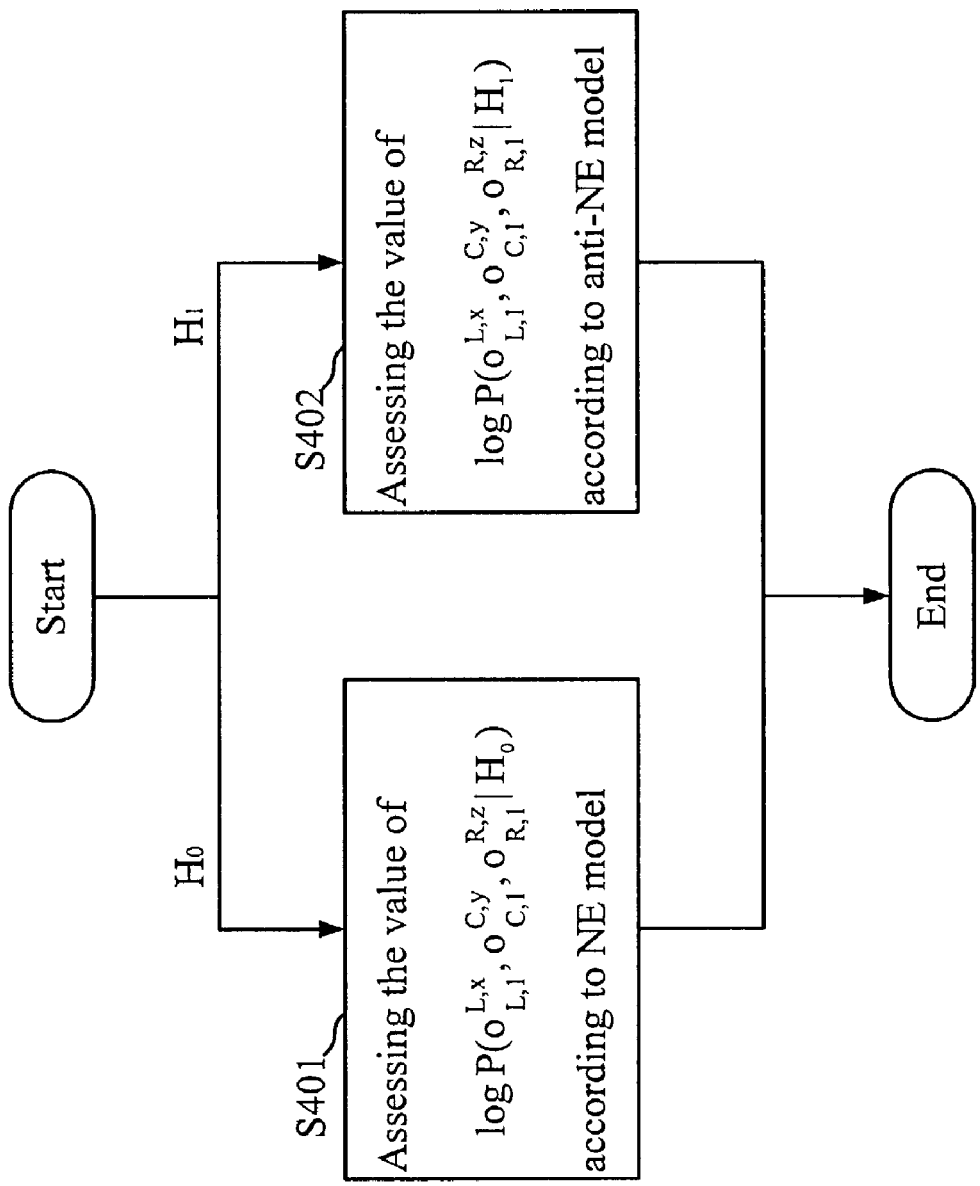
FIG. 4 is a flow chart illustrating the process of determining the confidence measure of the to-be-tested segment according to the present invention.

Due to a large amount of data involved in determining the probabilities, it is infeasible to precisely determine the probability $$P(o_{L,1}^{L,x}, o_{C,1}^{C,y}, o_{R,1}^{R,z} \mid H_0) \text{ and } P(o_{L,1}^{L,x}, o_{C,1}^{C,y}, o_{R,1}^{R,z} \mid H_1),$$

and thus a hypothesis model is built to estimate the probabilities. With reference to FIG. 4, in the null hypothesis $H_0$, a NE model assuming that the to-be-tested segment has a named-entity is provided to determine the value of $$P(o_{L,1}^{L,x}, o_{C,1}^{C,y}, o_{R,1}^{R,z} \mid H_0)$$

(step S401), wherein $$P(o_{L,1}^{L,x}, o_{C,1}^{C,y}, o_{R,1}^{R,z} \mid H_0)$$

is approximated as follows:

$$P(o_{L,1}^{L,x}, o_{C,1}^{C,y}, o_{R,1}^{R,z} \mid H_0) \equiv P_0(o_{L,1}^{L,x}, o_{C,1}^{C,y}, o_{R,1}^{R,z}) \approx P_0(o_{L,1}^{L,x}) P_0(o_{C,1}^{C,y}) P_0(o_{R,1}^{R,z}),$$

where $P_0$ is the probability of the null hypothesis being true. The probability $$P_0(o_{L,1}^{L,x})$$

is further approximated according to the N-gram model as follows:

$$P_0(o_{L,1}^{L,x}) \approx \prod_{i=1}^{x} P_0(o_{L,i} \mid o_{L,i-N+1}^{L,i-1})$$

$$P_0(o_{L,i} \mid o_{L,i-N+1}^{L,i-1}) = \begin{cases} P_0(o_{L,i} \mid o_{L,1}^{L,i-1}) & \text{,if } N > 1 \text{ and } i > 1 \text{ and } i-N \le 0 \\ P_0(o_{L,i}) & \text{,if } N = 1 \text{ or } i = 1 \end{cases}$$

where N is positive integer. It is noted that the random sequence $$o_{L,1}^{L,x}$$

is not necessary to be time invariant. For example, in the case of N=2, the probability $P_0(o_{L,i}=x \mid o_{L,i-1}=y)$ is not assumed to be equal to $P_0(o_{L,2}=x \mid o_{L,1}=y)$ for $i \geq 3$.

Likewise, the probability $$P_0(o_{R,1}^{R,z})$$

is also further approximated as follows:

$$P_0\left(o_{R,1}^{R,z}\right) \approx \prod_{i=1}^{z} P_0\left(o_{R,i} \mid o_{R,i-N+1}^{R,i-1}\right),$$

$$P_0\left(o_{R,i} \mid o_{R,i-N+1}^{R,i-1}\right) = \begin{cases} P_0\left(o_{R,i} \mid o_{R,1}^{R,i-1}\right), & \text{if } N > 1 \text{ and } i > 1 \text{ and } i-N \le 0 \\ P_0(o_{R,i}), & \text{if } N = 1 \text{ or } i = 1 \end{cases},$$

where N is positive integer.

The probability corresponding to the candidate is evaluated by applying the SCFG (Stochastic Context-free Grammar) as follows:

$$P_0\left(o_{C,1}^{C,y}\right) = \sum_T P_0(T) \approx \max_T P_0(T) = \max_T \prod_{A \to \alpha \in T} P_0(\alpha \mid A),$$

where T stands for one possible parse tree that derives the candidate, $A \to \alpha$ indicates a grammar rule in the parse tree T, 'A' stands for the left-hand-side symbol of the rule, and $\alpha$ stands for the sequence of right-hand-side symbols of the rule.

FIG. 3 shows an example of a parse tree 20 of the candidate "Ying Jeou Ma".

Based on the above hypothesis, it is able to obtain the NE model $$S_{NE}\left(o_{L,1}^{L,x}, o_{C,1}^{C,y}, o_{R,1}^{R,z}\right)$$

as:

$$S_{NE}\left(o_{L,1}^{L,x}, o_{C,1}^{C,y}, o_{R,1}^{R,z}\right) =$$

$$\sum_{i=1}^{x} \log P_0\left(o_{L,i} \middle| o_{L,i-N+1}^{L,i-1}\right) + \sum_{i=1}^{z} \log P_0\left(o_{R,i} \middle| o_{R,i-N+1}^{R,i-1}\right) + \max_{T} \sum_{A \to \alpha \in T} \log P_0(\alpha \mid A).$$

While in the alternative hypothesis $H_1$, an anti-NE model assuming that the to-be-tested segment does not have a named-entity is provided to determine the value of log $$P\left(o_{L,1}^{L,x}, o_{C,1}^{C,y}, o_{R,1}^{R,z} \middle| H_1\right)$$

(step S402), wherein log $$P\left(o_{L,1}^{L,x}, o_{C,1}^{C,y}, o_{R,1}^{R,z} \middle| H_1\right)$$

is approximated as follows:

$$P\left(o_{L,1}^{L,x}, o_{C,1}^{C,y}, o_{R,1}^{R,z} \middle| H_1\right) = P_1\left(o_{L,1}^{L,x}, o_{C,1}^{C,y}, o_{R,1}^{R,z}\right) \approx$$

$$\prod_{i=1}^{x} P_1\left(o_{L,i} \middle| o_{L,i-N+1}^{L,i-1}\right) \times \prod_{i=1}^{y} P_1\left(o_{C,i} \middle| o_{C,i-N+1}^{C,i-1}\right) \times \prod_{i=1}^{z} P_1\left(o_{R,i} \middle| o_{R,i-N+1}^{R,i-1}\right),$$

where N is a positive integer and $$\begin{cases} o_{R,j} = o_{C,y+j} & \text{if } j = 0, -1, -2 \ldots \\ o_{C,j} = o_{L,x+j} & \text{if } j = 0, -1, -2 \ldots \end{cases}$$

and $$P_1\left(o_{L,i} \middle| o_{L,i-N+1}^{L,i-1}\right) = \begin{cases} P_1\left(o_{L,i} \middle| o_{L,1}^{L,i-1}\right), & \text{if } N > 1 \text{ and } i > 1 \text{ and } i - N \le 0 \\ P_1(o_{L,i}), & \text{if } N = 1 \text{ or } i = 1 \end{cases}.$$

Therefore, based on the above hypothesis, it is able to obtain the anti-NE model $$S_{anti-NE}\left(o_{L,1}^{L,x}, o_{C,1}^{C,y}, o_{R,1}^{R,z}\right)$$

as:

$$S_{anti-NE}\left(o_{L,1}^{L,x}, o_{C,1}^{C,y}, o_{R,1}^{R,z}\right) = \sum_{i=1}^{x} \log P_1\left(o_{L,i} \middle| o_{L,i-N+1}^{L,i-1}\right) +$$

$$\sum_{i=1}^{y} \log P_1\left(o_{C,i} \middle| o_{C,i-N+1}^{C,i-1}\right) + \sum_{i=1}^{z} \log P_1\left(o_{R,i} \middle| o_{R,i-N+1}^{R,i-1}\right).$$

Then, the hypothesis test is performed by comparing the log likelihood ratio $$LLR\left(o_{L,1}^{L,x}, o_{C,1}^{C,y}, o_{R,1}^{R,z}\right)$$

to a predefined critical threshold δ (step S104). If $$LLR\left(o_{L,1}^{L,x}, o_{C,1}^{C,y}, o_{R,1}^{R,z}\right) \geq \delta,$$

the null hypothesis $H_0$ is accepted, representing that the to-be-tested segment includes a named-entity (step S105). If $$LLR\left(o_{L,1}^{L,x}, o_{C,1}^{C,y}, o_{R,1}^{R,z}\right) < \delta,$$

the null hypothesis $H_0$ is rejected, representing that the to-be-tested segment does not include a named-entity (step S106).

In view of the foregoing, it is known that the present invention provides a statistical verification model for solving the problem of named-entity recognition. This model determines the confidence measure of a name candidate not only according to the candidate's structure but also according to its contexts. In the present invention, the clues for confidence measurement are collected from both positive and negative examples in the training data in a statistical manner. As a result, the proposed model can be easily applied to different application domains of different languages.

Although the present invention has been explained in relation to its preferred embodiment, it is to be understood that many other possible modifications and variations can be made without departing from the spirit and scope of the invention as hereinafter claimed.

What is claimed is:

1. A method for named-entity recognition and verification, comprising the steps of:
   (A) segmenting text data from an article into at least one to-be-tested segments according to a text window;
   (B) parsing the to-be-tested segments to remove ill-formed segments from the to-be-tested segments according to a predefined grammar;
   (C) using a hypothesis test to assess a confidence measure of each to-be-tested segment, wherein the confidence measure is determined from dividing a probability $$P\left(o_{L,1}^{L,x}, o_{C,1}^{C,y}, o_{R,1}^{R,z} \middle| H_0\right)$$

of assuming that the to-be-teated tested segment has a named-entity by a probability $$P\left(o_{L,1}^{L,x}, o_{C,1}^{C,y}, o_{R,1}^{R,z} \middle| H_1\right)$$

of assuming that the to-be-tested segment doesn't have a named-entity, where $$o_{C,1}^{C,y}$$

is a candidate, $$o_{L,1}^{L,x}$$

is the left context of the candidate, and $$o_{R,1}^{R,z}$$

is the right context of the candidate; and
   (D) determining that the to-be-tested segment has a named-entity if the confidence measure is greater than a predefined threshold, wherein the confidence measure is expressed by a log likelihood ratio, $$LLR\left(o_{L,1}^{L,x}, o_{C,1}^{C,y}, o_{R,1}^{R,z}\right) = \log \frac{P\left(o_{L,1}^{L,x}, o_{C,1}^{C,y}, o_{R,1}^{R,z} \mid H_0\right)}{P\left(o_{L,1}^{L,x}, o_{C,1}^{C,y}, o_{R,1}^{R,z} \mid H_1\right)}.$$

2. The method as claimed in claim 1, wherein the text window has a plurality of random variables.

3. The method as claimed in claim 2, wherein the random variables have the candidate and its left and right contexts, and the named-entity of the to-be-tested segment corresponds to the candidate.

4. The method as claimed in claim 3, wherein the text window is $$O = \left(o_{L,1}^{L,x}, o_{C,1}^{C,y}, o_{R,1}^{R,z}\right).$$

5. The method as claimed in claim 4, wherein in step (D), the confidence measure is determined by using Neyman-Pearson Lemma.

6. The method as claimed in claim 1, wherein a named-entity model (NE model) is used to determine log $$P\left(o_{L,1}^{L,x}, o_{C,1}^{C,y}, o_{R,1}^{R,z} \mid H_0\right),$$

where $$P\left(o_{L,1}^{L,x}, o_{C,1}^{C,y}, o_{R,1}^{R,z} \mid H_0\right)$$

approximates to $$P_0\left(o_{L,1}^{L,x}, o_{C,1}^{C,y}, o_{R,1}^{R,z}\right),$$

and $$P_0\left(o_{L,1}^{L,x}, o_{C,1}^{C,y}, o_{R,1}^{R,z}\right)$$

approximates to $$P_0(o_{L,1}^{L,x})P_0(o_{C,1}^{C,y})P_0(o_{R,1}^{R,z}).$$

7. The method as claimed in claim 6, wherein $$P_0(o_{L,1}^{L,x})$$

approximates to $$\prod_{i=1}^{x} P_0(o_{L,i} \mid o_{L,i-N+1}^{L,i-1}),$$

and $$P_0(o_{L,i} \mid o_{L,i-N+1}^{L,i-1})$$

equals to $$\begin{cases} P_0(o_{L,i} \mid o_{L,1}^{L,i-1}), & \text{if } N > 1 \text{ and } i > 1 \text{ and } i - N \leq 0 \\ P_0(o_{L,i}), & \text{if } N = 1 \text{ or } i = 1 \end{cases},$$

where N is a positive integer.

8. The method as claimed in claim 6, wherein $$P_0(o_{R,1}^{R,z})$$

approximates to $$\prod_{i=1}^{2} P_0(o_{R,i} \mid o_{R,i-N+1}^{R,i-1}),$$

and $$P_0(o_{R,i} \mid o_{R,i-N+1}^{R,i-1})$$

equals to $$\begin{cases} P_0(o_{R,i} \mid o_{R,1}^{R,i-1}), & \text{if } N > 1 \text{ and } i > 1 \text{ and } i - N \leq 0 \\ P_0(o_{R,i}), & \text{if } N = 1 \text{ or } i = 1 \end{cases},$$

where N is a positive integer.

9. The method as claimed in claim 6, wherein $$P_0(o_{C,1}^{C,y})$$

equals to $$\sum_T P_0(T),$$

and $$\sum_T P_0(T)$$

approximates to $$\max_T P_0(T) = \max_T \prod_{A \to \alpha \in T} P_0(\alpha \mid A),$$

where T is a possible parsing tree, and A→α is a rule in the parsing tree T.

10. The method as claimed in claim 9, wherein the NE model $$S_{NE}\left(o_{L,1}^{L,x}, o_{C,1}^{C,y}, o_{R,1}^{R,z}\right) \text{ is } \sum_{i=1}^{x} \log P_0(o_{L,i} \mid o_{L,i-N+1}^{L,i-1}) + \sum_{i=1}^{z} \log P_0(o_{R,i} \mid o_{R,i-N+1}^{R,i-1}) + \max_T \sum_{A \to \alpha \in T} \log P_0(\alpha \mid A).$$

11. The method as claimed in claim 1, wherein an anti-named-entity model (anti-NE model) is used to determine $$P\!\left(o_{L,1}^{L,x}, o_{C,1}^{C,y}, o_{R,1}^{R,z} \mid H_1\right),$$

where $$P\!\left(o_{L,1}^{L,x}, o_{C,1}^{C,y}, o_{R,1}^{R,z} \mid H_1\right) \text{ is } P_1\!\left(o_{L,1}^{L,x}, o_{C,1}^{C,y}, o_{R,1}^{R,z}\right), P_1\!\left(o_{L,1}^{L,x}, o_{C,1}^{C,y}, o_{R,1}^{R,z}\right)$$

approximates to $$\prod_{i=1}^{x} P_1\!\left(o_{L,i} \mid o_{L,i-N+1}^{L,i-1}\right) \times \prod_{i=1}^{y} P_1\!\left(o_{C,i} \mid o_{C,i-N+1}^{C,i-1}\right) \times \prod_{i=1}^{z} P_1\!\left(o_{R,i} \mid o_{R,i-N+1}^{R,i-1}\right),$$

and N is a positive integer.

12. The method as claimed in claim 11, wherein $o_{R,j}$ equals to $o_{C,y+j}$ if j=0, −1, −2, . . . , $o_{C,j}$ equals to $o_{L,x+j}$ if j=0, −1, −2, . . . , and $$P_1(o_{L,i} \mid o_{L,i-N+1}^{L,i-1})$$

equals to $$\begin{cases} P_1(o_{L,i} \mid o_{L,1}^{L,i-1}), & \text{if } N > 1 \text{ and } i > 1 \text{ and } i - N \leq 0 \\ P_1(o_{L,i}), & \text{if } N = 1 \text{ or } i = 1 \end{cases}.$$

13. The method as claimed in claim 11, wherein the anti-NE model $$S_{anti-NE}\!\left(o_{L,1}^{L,x}, o_{C,1}^{C,y}, o_{R,1}^{R,z}\right) \text{ is } \sum_{i=1}^{x} \log P_1(o_{L,i} \mid o_{L,i-N+1}^{L,i-1}) + \sum_{i=1}^{y} \log P_1\!\left(o_{C,i} \mid o_{C,i-N+1}^{C,i-1}\right) + \sum_{i=1}^{z} \log P_1\!\left(o_{R,i} \mid o_{R,i-N+1}^{R,i-1}\right).$$

14. The method as claimed in claim 1, wherein the candidate $$o_{C,1}^{C,y}$$

is composed of random variables $o_{c,1}, o_{c,2} \ldots$ , and $o_{c,y}$, where y is the number of characters of the candidate.

15. The method as claimed in claim 1, wherein the left context $$o_{L,1}^{L,x}$$

is composed of random variables $o_{L,1}, o_{L,2} \ldots$ , and $o_{L,x}$, where x is the number of characters of the left context.

16. The method as claimed in claim 1, wherein the right context $$o_{R,1}^{R,z}$$

is composed of random variables $o_{R,1}, o_{R,2} \ldots$ , and $o_{R,z}$, where z is the number of characters of the right context.

17. The method as claimed in claim 2, wherein each random variable is a Chinese character.

18. The method as claimed in claim 2, wherein each random variable is an English word.

* * * * *